C. WELLS.
WINDSHIELD OR THE LIKE.
APPLICATION FILED JAN. 13, 1919.
1,344,010. Patented June 22, 1920.
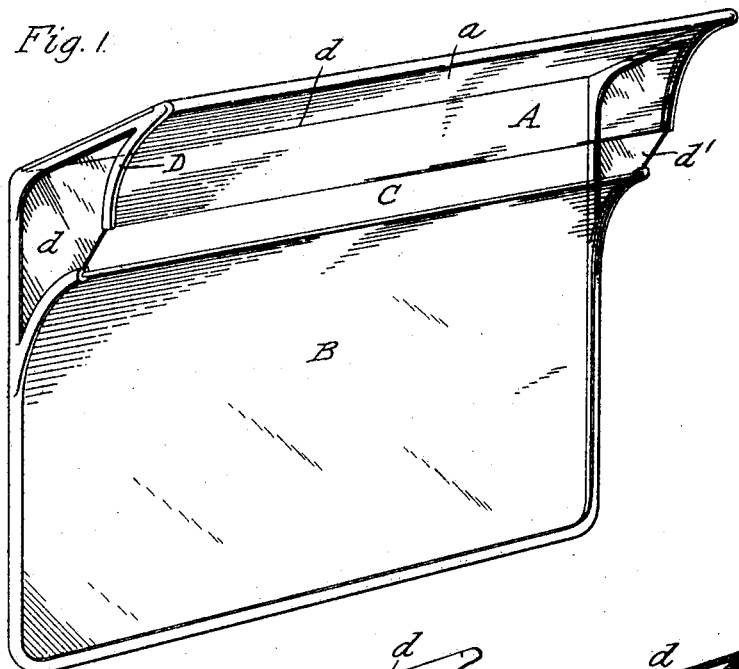
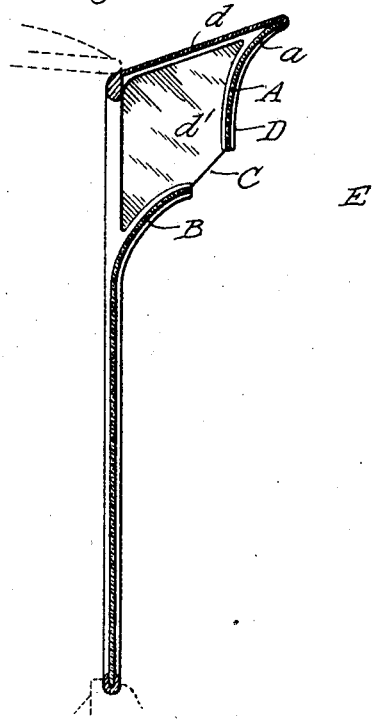
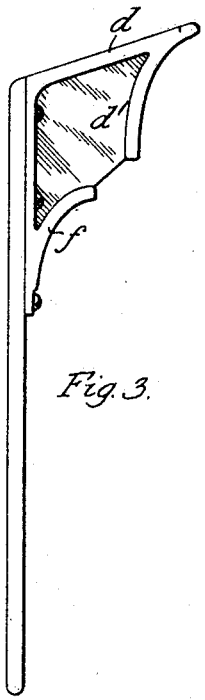
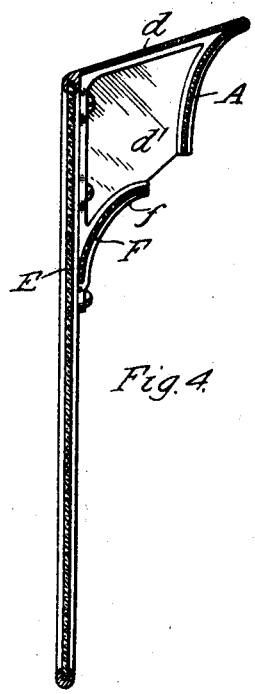
INVENTOR.
Chandler Wells,
By Wilhelm & Parker.
ATTORNEYS.

UNITED STATES PATENT OFFICE.

CHANDLER WELLS, OF BUFFALO, NEW YORK.

WINDSHIELD OR THE LIKE.

1,344,010.   Specification of Letters Patent.   Patented June 22, 1920.

Application filed January 13, 1919. Serial No. 270,828.

*To all whom it may concern:*

Be it known that I, CHANDLER WELLS, a citizen of the United States, residing at Buffalo, in the county of Erie and State of New York, have invented a new and useful Improvement in Windshields or the like, of which the following is a specification.

This invention relates to shields of the kind adapted to be placed in front of a driver or other occupants of a vehicle to afford protection against wind, rain, snow or the like.

The objects of the invention are to produce a shield of this kind having a slot or opening through which an occupant of the vehicle can see, and to so form the shield as to prevent air, rain, snow or dust from passing through the slot; also to improve the construction of shields of this kind in other respects hereinafter specified.

In the accompanying drawings:

Figure 1 is a perspective view of a shield embodying the invention.

Fig. 2 is a sectional elevation thereof.

Fig. 3 is a side elevation of a shield embodying the invention used in connection with a windshield or window of usual construction.

Fig. 4 is a sectional view thereof.

When an automobile, street car, airplane, or other vehicle provided with windshields or windows is driven through rain, snow, or dust, considerable difficulty is often experienced in keeping the windshield or window clean enough for the driver to obtain a clear view to enable him to properly guide the vehicle. This difficulty is overcome by providing a shield having an upper portion or plate and a lower portion which are spaced apart to form a slot through which the operator of the vehicle can see, the upper plate being curved or otherwise formed in such a manner that when the vehicle is in motion, the air striking the upper plate will be deflected downwardly across the slot or space between the two portions of the shield with sufficient force to prevent any of the air from passing through the slot, the lower plate of the shield being preferably so formed as to prevent air from forming eddies which might force air through the slot.

In the embodiment of the invention shown in the drawings, A represents the upper portion or plate of the shield and B the lower portion or plate thereof, the two plates of the shield being spaced apart to form a slot or space C which is arranged in proper relation to the eyes of the occupants of the vehicle. The upper plate of the shield is provided with a curved or rearwardly inclined upper part $a$ which is so shaped that the air striking against this part of the shield will be deflected downwardly with sufficient force to carry it across the slot C without permitting any air to pass through the slot into the vehicle. The lower part of the plate A of the shield is preferably made flat, so that when the shield is made of glass or other transparent material, and when the vehicle is driven in clear weather, this part of the shield will afford a clear and unrefracted view. The plates A and B of the shield, while preferably made of transparent material, may be made of any other material since the slot between the two plates gives the operator of the vehicle all the view that is necessary.

The lower plate B of the shield is made to incline or curve rearwardly and the upper edge thereof is spaced below and in rear of the lower edge of the upper plate of the shield, so that the slot between the two plates affords a view ahead, to the sides and downwardly. The wind striking against this plate of the shield is also deflected downwardly owing to the inclination or curvature thereof and this action of the lower plate of the shield supplements the action of the upper plate A and insures the producing of a downwardly flowing current of air across the two plates of the shield which will be strong enough to pass across the slot C without passing into the same and to carry any air, rain, snow or dust which is moving toward the slot, downwardly to the lower plate of the shield.

Below the inclined or curved portion of the lower plate B of the windshield a substantially upright portion is provided which, as shown in Figs. 1 and 2, forms a continuation thereof and which directs the air downwardly. This upright portion of the windshield prevents the air which is directed upwardly by the cowl or other part of an automobile or other vehicle from opposing the downward flow of air over the curved or inclined portion of the lower plate of the windshield and thus forcing air into the slot C. This upright portion is preferably made of considerable height so as to give the downwardly and upwardly directed currents of air flowing over this surface plenty of opportunity to become dispersed and thus not cause the air to flow into the slot.

The shield may be mounted on the vehicle in any suitable manner, being provided in the construction shown with a frame or binding D extending around the sides thereof, and a top or covering plate d is provided to prevent rain, snow or the like from getting behind the shield. If desired, side members d' may be provided at the sides of the shield which prevent air from entering the vehicle at the sides of the shield. Any other means for mounting the shield may be provided.

In the construction shown in Figs. 3 and 4, the shield is used in connection with a window or windshield E of any usual or suitable construction. The shield in this case keeps the window or windshield E clear. In this construction the parts of the shield are mounted on a frame f which may be suitably secured to the frame of the window or windshield E. In this modified construction, the lower plate F of the shield is made comparatively short, the lower portion of the windshield E forming substantially a continuation of the lower plate F of the front shield, and serving the same purpose as the upright portion of the lower plate shown in Figs. 1 and 2.

The advantages of the shield described are that the slot between the two plates of the shield is always clear so that the operator of the vehicle can always have a clear view ahead and that practically no air, moisture or dust enters through the slot. In clear weather, the curved surfaces of the plates, if made of transparent material, offer practically no obstruction to the vision.

I claim as my invention:

1. A shield for vehicles including an upper plate, and a lower plate spaced below and rearwardly with regard to said upper plate to form a slot between said two plates, said upper and lower plates having rearwardly and downwardly inclined parts causing a current of air to flow downwardly across said slot from the outer face of said upper plate to the outer face of said lower plate when said vehicle is moving forward, and a substantially upright part below said inclined part of said lower plate and which forms substantially a continuation thereof.

2. A shield for vehicles including an upper plate, and a lower plate spaced below and rearwardly with regard to said upper plate to form a slot between said two plates, said upper plate having a rearwardly and downwardly extending curved portion causing the forward motion of the vehicle to produce a current of air flowing downwardly from said upper plate and across said slot, a rearwardly and downwardly inclined part on said lower plate adjacent to said slot to cause the current of air to flow downwardly across the front face of said lower plate of the shield, and a substantially upright part below said inclined part of said lower plate and forming substantially a continuation thereof.

3. A shield for vehicles including an upper plate, and a lower plate spaced below and rearwardly with regard to said upper plate to form a slot between said two plates, said upper plate having a rearwardly and downwardly extending curved portion causing the forward motion of the vehicle to produce a current of air flowing downwardly from said upper plate and across said slot, said lower plate having a part curved rearwardly and downwardly for causing the air to pass downwardly over the front face of said lower plate of the shield, and a substantially upright part arranged below said curved part of the lower plate and forming substantially a continuation thereof over which the air flows downwardly.

4. A shield for vehicles including an upper plate having a part inclined downwardly and rearwardly, a lower plate, the upper edge of which is arranged below and in rear of the lower edge of said upper plate, to form a slot, said upper plate of the shield causing a current of air to flow downwardly across said plate and across said slot when the vehicle is moving forwardly, said lower plate having a part curved rearwardly and downwardly for causing the air to pass downwardly over the front face of said lower plate of the shield, and a substantially upright portion below said curved part.

5. A shield for vehicles including two plates spaced apart to form a slot, one of said plates being arranged above and ahead of the other and being inclined downwardly and rearwardly toward said other plate to deflect air across said slot when the vehicle is in motion, and said other plate having its upper portion inclined downwardly and rearwardly from said slot so that the front face thereof carries off the air discharged across said slot independently of the velocity imparted to the air by said upper plate, said lower plate having a substantially upright portion arranged below said upper inclined portion.

Witness my hand, this 11th day of January, 1919.

CHANDLER WELLS.

Witnesses:
A. B. WRIGHT,
E. KLEINSCHMIDT.